United States Patent
Rose et al.

(10) Patent No.: US 10,662,307 B2
(45) Date of Patent: May 26, 2020

(54) FLUOROPOLYMER FILM

(71) Applicants: SOLVAY SA, Brussels (BE);
COLLEGE DE FRANCE, Paris (FR)

(72) Inventors: Séverine Rose, Paris (FR); Christel Laberty-Robert, Paris (FR); Clément Sanchez, Bures (FR); Julio A. Abusleme, Saronno (IT)

(73) Assignees: SOLVAY SA, Brussels (BE);
COLLEGE OF FRANCE, Paris (FR)

( * ) Notice: Subject to any disclaimer, the term of this patent is extended or adjusted under 35 U.S.C. 154(b) by 131 days.

(21) Appl. No.: 15/536,898

(22) PCT Filed: Dec. 18, 2015

(86) PCT No.: PCT/EP2015/080637
§ 371 (c)(1),
(2) Date: Jun. 16, 2017

(87) PCT Pub. No.: WO2016/102397
PCT Pub. Date: Jun. 30, 2016

(65) Prior Publication Data
US 2017/0342228 A1    Nov. 30, 2017

(30) Foreign Application Priority Data

Dec. 22, 2014 (EP) .................................. 14307146

(51) Int. Cl.
| | |
|---|---|
| *C08J 7/04* | (2020.01) |
| *H01M 10/052* | (2010.01) |
| *H01M 2/16* | (2006.01) |
| *C08F 214/22* | (2006.01) |
| *H01M 8/1039* | (2016.01) |
| *B05D 1/02* | (2006.01) |
| *C09D 127/22* | (2006.01) |

(52) U.S. Cl.
CPC .............. *C08J 7/0427* (2020.01); *B05D 1/02* (2013.01); *C08F 214/225* (2013.01); *C09D 127/22* (2013.01); *H01M 2/1653* (2013.01); *H01M 8/1039* (2013.01); *H01M 10/052* (2013.01); *C08J 2327/12* (2013.01); *C08J 2327/18* (2013.01); *C08J 2427/12* (2013.01); *C08J 2427/20* (2013.01); *Y02P 70/56* (2015.11)

(58) Field of Classification Search
None
See application file for complete search history.

(56) References Cited

U.S. PATENT DOCUMENTS

| | | | |
|---|---|---|---|
| 3,514,425 | A | 5/1970 | Engelhardt |
| 6,203,944 | B1 | 3/2001 | Turner et al. |
| 2006/0223894 | A1 | 10/2006 | Ghielmi et al. |

FOREIGN PATENT DOCUMENTS

| | | | | |
|---|---|---|---|---|
| CN | 102918070 | A | 2/2013 | |
| JP | 2006-257423 | A | 9/2006 | |
| JP | 2010-537387 | A | 12/2010 | |
| JP | 2013-530256 | A | 7/2013 | |
| JP | 2014-516369 | A | 7/2014 | |
| WO | 0003444 | A1 | 1/2000 | |
| WO | 2009/026467 | A1 | 2/2009 | |
| WO | 2011/121078 | A1 | 10/2011 | |
| WO | 2011121078 | A1 | 10/2011 | |
| WO | WO-2011121078 | A1 * | 10/2011 | ................ C08F 8/00 |
| WO | 2012/136688 | A1 | 10/2012 | |
| WO | 2013072216 | A1 | 5/2013 | |
| WO | WO-2013072216 | A1 * | 5/2013 | .......... C08F 214/186 |
| WO | 2013/120858 | A1 | 8/2013 | |
| WO | 2013/160240 | A1 | 10/2013 | |
| WO | 2014/023593 | A | 2/2014 | |
| WO | 2014/067816 | A1 | 5/2014 | |
| WO | 2014086906 | A1 | 6/2014 | |
| WO | WO-2014086906 | A1 * | 6/2014 | ............ H01M 2/145 |

* cited by examiner

*Primary Examiner* — Michael P. Rodriguez

(57) ABSTRACT

The present invention pertains to a fluoropolymer film comprising at least one fluoropolymer hybrid organic/inorganic composite [polymer (FH)], to a process for the manufacture of said fluoropolymer film and to uses of said fluoropolymer film in various applications, in particular in electrochemical applications.

18 Claims, No Drawings

FLUOROPOLYMER FILM

This application is a U.S. national stage entry under 35 U.S.C. § 371 of International Application No. PCT/EP2015/080637 filed Dec, 18, 2015, which claims priority to European application No. 14307146.2 filed on Dec. 22, 2014. The entire contents of these applications are explicitly incorporated herein by this reference.

TECHNICAL FIELD

The present invention pertains to a fluoropolymer film, to a process for the manufacture of said fluoropolymer film and to uses of said fluoropolymer film in various applications, in particular in electrochemical applications.

BACKGROUND ART

Energy storage systems, including electrochemical devices such as Lithium-ion batteries having high energy densities, increasingly have to comply with safety requirements to meet the growing demand for large-size electrochemical cells.

One of the most critically important components to ensure safety of an electrochemical cell is the separator, whose primary function is to prevent physical and electric contact between the positive electrode and the negative electrode of the electrochemical cell while permitting electrolyte ions to flow there through.

Basically, two types of separators can be used: either porous ones, wherein a solution of an electrolyte in a suitable solvent fills the porosity of the separator, or non-porous ones, which are generally either pure solid polymer electrolyte (i.e. electrolyte dissolved in a high molecular weight polyether host, like PEO and PPO, which acts as solid solvent) or gelled polymer electrolyte system, which incorporates into a polymer matrix a liquid plasticizer or solvent capable of forming a stable gel within the polymer host matrix and an electrolyte.

The separator must be chemically and electrochemically stable towards the electrolyte and the electrode materials and must be mechanically strong to withstand high tensions generated during battery assembly operations. Also, its structure and properties considerably affect battery performances, including energy density, power density, cycle life as well as safety.

For high energy and power densities, the separator is required to be very thin and highly porous while still remaining mechanically strong.

For battery safety, the separator should be able to shut the battery down when overheating occurs so that thermal runaway, causing dimensional shrinking or melting of the separator, which results in physical contact of the electrodes, and the resulting internal short circuit can be avoided.

Also, a low thickness of the separator is required for high energy and power densities. However, this adversely affects the mechanical strength of the separator and the safety of the battery thereby provided.

One particular challenge always desired has been to provide a film separator or membrane separator with enhanced ionic conductivity allowing an excellent performance at higher charge/discharge cycle rates. In particular, in the case of hybrids inorganic-organic systems where safety is assured by the inorganic part, a higher performance of the membranes is highly desired.

There is thus still the need in the art for an alternative process for manufacturing membranes having high ionic conductivity to be suitably used as separators in electrochemical devices while maintaining outstanding thermomechanical properties during operation of the same.

SUMMARY OF INVENTION

It has been now surprisingly found that a fluoropolymer film can be easily obtainable by the process of the invention.

The fluoropolymer film of the invention successfully exhibits outstanding mechanical properties to be suitably used in various applications.

In a first instance, the present invention pertains to a process for the manufacture of a fluoropolymer film, said process comprising the following steps:

(i) providing a composition [composition (C)] comprising:
  at least one fluoropolymer [polymer (F)] comprising recurring units derived from at least one fluorinated monomer [monomer (F)] and at least one hydrogenated monomer comprising at least one hydroxyl group [monomer (OH)],
  at least one functional metal compound [functional compound (M1)] of formula (I):

$$X_{4-m}AY_m \qquad (I)$$ 

wherein m is an integer from 1 to 3, A is a metal selected from the group consisting of Si, Ti and Zr, Y is a hydrolysable group and X is a hydrocarbon group comprising at least one sulphonic group in its acid, ester, salt or halide form,
  at least one non-functional metal compound [non-functional compound (M2)] of formula (II):

$$X'_{4-m'}A'Y'_{m'} \qquad (II)$$ 

wherein m' is an integer from 1 to 4 and, according to certain embodiments, from 1 to 3, A' is a metal selected from the group consisting of Si, Ti and Zr, Y' is a hydrolysable group and X' is a hydrocarbon group, and
  a liquid medium [medium (L)];
(ii) providing a substrate;
(iii) applying by spray coating the composition (C) provided in step (i) onto at least one surface of the substrate provided in step (ii) thereby providing a coated substrate; and
(iv) drying the coated substrate provided in step (iii).

In a second instance, the present invention pertains to a fluoropolymer film obtainable by the process of the invention.

For the purpose of the present invention, the term "film" is defined according to its usual meaning and is intended to denote a piece of material having a thickness smaller than either of its length or its width.

The polymer (F) is typically obtainable by emulsion polymerization or suspension polymerization.

The polymer (F) is typically obtainable by polymerization of at least one monomer (F) and at least one monomer (OH).

The polymer (F) may further comprise recurring units derived from at least one hydrogenated monomer [monomer (H)] different from the monomer (OH).

Should the polymer (F) further comprise recurring units derived from at least one hydrogenated monomer [monomer (H)] different from the monomer (OH), it is typically obtainable by polymerization of at least one monomer (F), at least one monomer (OH) and at least one monomer (H) different from said monomer (OH).

By the term "fluorinated monomer [monomer (F)]" it is hereby intended to denote an ethylenically unsaturated monomer comprising at least one fluorine atom.

By the term "hydrogenated monomer [monomer (H)]" it is hereby intended to denote an ethylenically unsaturated monomer comprising at least one hydrogen atom and free from fluorine atoms.

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one hydrogenated monomer" is understood to mean that the polymer (F) may comprise recurring units derived from one or more than one hydrogenated monomers. In the rest of the text, the expression "hydrogenated monomers" is understood, for the purposes of the present invention, both in the plural and the singular, that is to say that they denote both one or more than one hydrogenated monomers as defined above.

The polymer (F) comprises preferably at least 0.01% by moles, more preferably at least 0.05% by moles, even more preferably at least 0.1% by moles of recurring units derived from at least one monomer (OH) as defined above.

The polymer (F) comprises preferably at most 20% by moles, more preferably at most 15% by moles, even more preferably at most 10% by moles, most preferably at most 3% by moles of recurring units derived from at least one monomer (OH) as defined above.

Determination of average mole percentage of monomer (OH) recurring units in polymer (F) can be performed by any suitable method. Mention can be notably made of acid-base titration methods, well suited e.g. for the determination of the acrylic acid content, of NMR methods, adequate for the quantification of monomers (OH) comprising aliphatic hydrogen atoms in side chains, of weight balance based on total fed monomer (OH) and unreacted residual monomer (OH) during polymer (F) manufacture.

The monomer (OH) is typically selected from the group consisting of (meth)acrylic monomers of formula (III) and vinylether monomers of formula (IV):

(III)

(IV)

wherein each of $R_1$, $R_2$ and $R_3$, equal to or different from each other, is independently a hydrogen atom or a $C_1$-$C_3$ hydrocarbon group, and $R_X$ is a $C_1$-$C_5$ hydrocarbon moiety comprising at least one hydroxyl group.

The monomer (OH) is preferably of formula (III) as defined above.

The monomer (OH) is more preferably of formula (III-A):

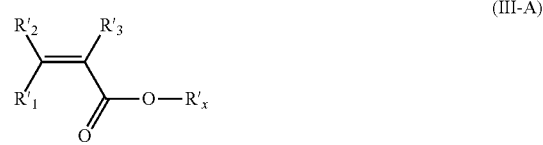

(III-A)

wherein $R'_1$, $R'_2$ and $R'_3$ are hydrogen atoms and $R'_X$ is a $C_1$-$C_5$ hydrocarbon moiety comprising at least one hydroxyl group.

Non-limiting examples of monomers (OH) include, notably, hydroxyethyl(meth)acrylate, hydroxypropyl(meth)acrylate, hydroxyethylhexyl(meth)acrylate.

The monomer (OH) is even more preferably selected from the followings:

hydroxyethyl acrylate (HEA) of formula:

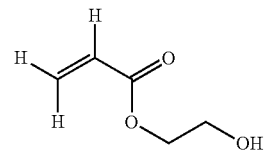

2-hydroxypropyl acrylate (HPA) of either of formulae:

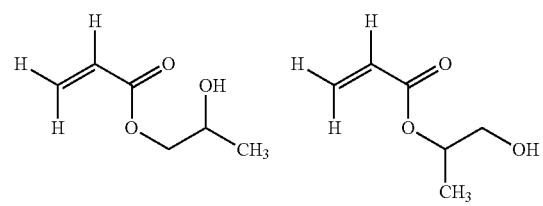

and mixtures thereof.

The polymer (F) may be amorphous or semi-crystalline.

The term "amorphous" is hereby intended to denote a polymer (F) having a heat of fusion of less than 5 J/g, preferably of less than 3 J/g, more preferably of less than 2 J/g, as measured according to ASTM D-3418-08.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

Non-limiting examples of suitable monomers (F) include, notably, the followings:

$C_2$-$C_8$ perfluoroolefins, such as tetrafluoroethylene and hexafluoropropylene;

$C_2$-$C_8$ hydrogenated fluoroolefins, such as vinylidene fluoride, vinyl fluoride, 1,2-difluoroethylene and trifluoroethylene;

perfluoroalkylethylenes of formula $CH_2$=$CH$-$R_{f0}$ wherein $R_{f0}$ is a $C_1$-$C_6$ perfluoroalkyl;

chloro- and/or bromo- and/or iodo-$C_2$-$C_6$ fluoroolefins, such as chlorotrifluoroethylene;

(per)fluoroalkylvinylethers of formula $CF_2$=$CFOR_{f1}$ wherein $R_{f1}$ is a $C_1$-$C_6$ fluoro- or perfluoroalkyl, e.g. $CF_3$, $C_2F_5$, $C_3F_7$;

$CF_2$=$CFOX_0$ (per)fluoro-oxyalkylvinylethers wherein $X_0$ is a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group;

(per)fluoroalkylvinylethers of formula $CF_2$=$CFOCF_2OR_{f2}$ wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups, such as —$C_2F_5$—O—$CF_3$;

functional (per)fluoro-oxyalkylvinylethers of formula $CF_2$=$CFOY_0$ wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form;

fluorodioxoles, preferably perfluorodioxoles.

Non-limiting examples of suitable monomers (H) include, notably, ethylene, propylene and isobutylene, and styrene monomers such as styrene and p-methylstyrene.

The polymer (F) comprises preferably more than 25% by moles, preferably more than 30% by moles of recurring units derived from at least one monomer (F).

The monomer (F) may further comprise one or more other halogen atoms (Cl, Br, I).

Should the monomer (F) be free of hydrogen atoms, it is designated as per(halo)fluoromonomer.

Should the monomer (F) comprise at least one hydrogen atom, it is designated as hydrogen-containing fluorinated monomer.

Should the monomer (F) be a hydrogen-containing fluorinated monomer, such as for instance vinylidene fluoride, trifluoroethylene, vinyl fluoride, the polymer (F) is either a polymer comprising recurring units derived from said hydrogen-containing fluorinated monomer and at least one monomer (OH) as defined above, or it is a polymer comprising recurring units derived from said hydrogen-containing fluorinated monomer, at least one monomer (OH) as defined above and at least one other monomer.

Should the monomer (F) be a per(halo)fluoromonomer, such as for instance tetrafluoroethylene, chlorotrifluoroethylene, hexafluoropropylene, perfluoroalkylvinylethers, the polymer (F) is a polymer comprising recurring units derived from said per(halo)fluoromonomer, at least one monomer (OH) as defined above and at least one monomer (H) different from the monomer (OH).

Preferred polymers (F) are those comprising one or more backbone chains, said backbone chains comprising recurring units derived from at least one monomer (F) selected from the group consisting of vinylidene fluoride (VDF), tetrafluoroethylene (TFE) and chlorotrifluoroethylene (CTFE).

The polymer (F) is typically selected from the group consisting of polymers (F-1) comprising recurring units derived from:
vinylidene fluoride (VDF),
at least one monomer (OH) as defined above, and
optionally, at least one monomer (F) different from VDF.

The polymer (F) is preferably selected from the group consisting of polymers (F-1) comprising recurring units derived from:
vinylidene fluoride (VDF),
at least one monomer (OH) of formula (III) as defined above, and
optionally, at least one monomer (F) different from VDF.

The polymer (F-1) more preferably comprises:
(a) at least 60% by moles, preferably at least 75% by moles, more preferably at least 85% by moles of vinylidene fluoride (VDF);

(b) optionally, from 0.1% to 15% by moles, preferably from 0.1% to 12% by moles, more preferably from 0.1% to 10% by moles of at least one monomer (F) selected from vinyl fluoride ($VF_1$), chlorotrifluoroethylene (CTFE), hexafluoropropylene (HFP), tetrafluoroethylene (TFE), trifluoroethylene (TrFE), perfluoromethylvinylether (PMVE); and (c) from 0.01% to 20% by moles, preferably from 0.05% to 18% by moles, more preferably from 0.1% to 10% by moles, even more preferably from 0.3% to 3% by moles of at least one monomer (OH) of formula (III) as defined above.

Under step (i) of the process of the invention, the composition (C) typically comprises at least one polymer (F) in an amount comprised between 2% and 30% by weight, preferably between 5% and 15% by weight, based on the total weight of said at least one polymer (F) and the medium (L).

The choice of the substrate in step (ii) of the process of the invention is not particularly limited, being understood that, as a function of the material of said substrate, the fluoropolymer film obtainable by the process of the invention may be detached from the coated substrate provided in step (iv) thereby providing a free standing fluoropolymer film or may be provided as a unitary assembly in the form of the coated substrate provided in step (iv), wherein the fluoropolymer film is supported onto at least one surface of said substrate.

The substrate provided in step (ii) of the process of the invention may be either a monolayer substrate comprising a single layer or a multilayer substrate comprising a plurality of layers, said layers being independently either porous layers or non-porous layers.

According to a first embodiment of the invention, the fluoropolymer film obtainable by the process of the invention is provided in the form of a free standing fluoropolymer film.

The process for the manufacture of a fluoropolymer film according to this first embodiment of the invention typically further comprises the following step:

(v) detaching a fluoropolymer film from the coated substrate provided in step (iv).

The substrate provided in step (ii) of the process according to this first embodiment of the invention typically comprises, preferably consists of, a composition comprising:

from 70% to 99.9% by weight, preferably from 90% to 99% by weight, based on the total weight of the composition, of at least one polymer (F) selected from the group consisting of polymers (F-2) comprising recurring units derived from at least one per(halo) fluoromonomer selected from the group consisting of tetrafluoroethylene (TFE) and chlorotrifluoroethylene (CTFE), at least one monomer (H) selected from ethylene, propylene and isobutylene, and, optionally, or more additional monomers, typically in amounts of from 0.01% to 30% by moles, based on the total amount of TFE and/or CTFE and said monomer (H), and from 0.1% to 30% by weight, preferably from 1% to 10% by weight, based on the total weight of the composition, of mica.

In polymers (F-2) as defined above, the molar ratio per(halo)fluoromonomer(s)/monomer(s) (H) is typically of from 30:70 to 70:30. In polymers (F-2) as defined above, the monomer (H) is preferably ethylene, optionally in combination with other monomers (H).

Polymers (F-2) wherein the per(halo)fluoromonomer is predominantly chlorotrifluoroethylene (CTFE) will be identified herein below as ECTFE copolymers; polymers (F-2) wherein the per(halo)fluoromonomer is predominantly tetrafluoroethylene (TFE) will be identified herein below as ETFE copolymers.

The polymer (F-2) preferably comprises:

(a') from 35% to 65% by moles, preferably from 45% to 55% by moles, more preferably from 48% to 52% by moles of at least one per(halo)fluoromonomer selected from the group consisting of chlorotrifluoroethylene (CTFE) and tetrafluoroethylene (TFE); and (b') from 35% to 65% by moles, preferably from 45% to 55% by moles, more preferably from 48% to 52% by moles of ethylene (E).

Among polymers (F-2), ECTFE polymers are preferred.

Non-limiting examples of polymers (F-2) suitable for use in the composition of the substrate provided in step (ii) of the process according to this first embodiment of the invention typically have a melting temperature of at least 180° C., preferably of at least 200° C.

The melting temperature is determined by Differential Scanning Calorimetry (DSC) at a heating rate of 10° C./min, according to ASTM D 3418.

It has been found that by using such substrate the fluoropolymer film obtainable by the process of this first embodiment of the invention can be advantageously easily detached from at least one surface of said substrate while leaving its surface advantageously homogeneous and free of defects.

According to a second embodiment of the invention, the fluoropolymer film obtainable by the process of the invention is provided in the form of a coated substrate, wherein the fluoropolymer film is supported onto at least one surface of said substrate.

The substrate provided in step (ii) of the process according to this second embodiment of the invention may be either a separator or an electrode, either a positive electrode or a negative electrode, for an electrochemical device such as a battery, especially a secondary battery, preferably a Lithium-ion battery.

Should the substrate provided in step (ii) of the process according to this second embodiment of the invention be a separator for an electrochemical device, it typically consists of a porous polyolefin.

The fluoropolymer film of the invention advantageously comprises at least one fluoropolymer hybrid organic/inorganic composite [polymer (FH)].

The fluoropolymer film of the invention typically consists of at least one polymer (FH).

Under step (iii) of the process of the invention, the polymer (F), the functional compound (M1) of formula (I) and the non-functional compound (M2) of formula (II) are advantageously reacted at temperatures typically comprised between 20° C. and 100° C. Temperatures between 20° C. and 90° C., preferably between 20° C. and 50° C. will be preferred. The skilled in the art will properly select the temperature depending on the boiling point of the medium (L).

Under step (iii) of the process of the invention, a grafted fluoropolymer [polymer (FG)] is typically obtainable by reacting at least a fraction of the hydroxyl groups of the monomer (OH) of at least one polymer (F) with at least a fraction of the functional compound (M1) and at least a fraction of the non-functional compound (M2), said polymer (FG) comprising:

a fluorinated main chain comprising recurring units derived from at least one fluorinated monomer [monomer (F)] and at least one hydrogenated monomer [monomer (H)], at least one pendant side chain comprising an end group of formula —O-AY$_{m-1}$X$_{4-m}$ (I-M1), wherein m, Y, A and X have the same meaning as defined above, and at least one pendant side chain comprising an end group of formula —O-A'Y'$_{m'-1}$X'$_{4-m'}$ (II-M2), wherein m', Y', A' and X' have the same meaning as defined above.

The polymer (FG) typically comprises:

a fluorinated main chain comprising recurring units derived from at least one fluorinated monomer [monomer (F)] and at least one hydrogenated monomer [monomer (H)], at least one pendant side chain comprising an end group of formula —O-AY$_{m-1}$X$_{4-m}$ (I-M1), wherein m, Y, A and X have the same meaning as defined above, and at least one pendant side chain comprising an end group of formula —O-A'Y'$_{m'-1}$X'$_{4-m'}$ (II-M2), wherein m', Y', A' and X' have the same meaning as defined above, wherein the mole ratio of the end groups of formula —O-AY$_{m-1}$X$_{4-m}$ (I-M1) to the end groups of formula —O-A'Y'$_{m'-1}$X'$_{4-m'}$ (II-M2) is preferably at most 2.0, more preferably at most 1.5, even more preferably at most 1.0.

The polymer (FG) typically comprises:

a fluorinated main chain comprising recurring units derived from at least one fluorinated monomer [monomer (F)] and at least one hydrogenated monomer [monomer (H)], at least one pendant side chain comprising an end group of formula —O-AY$_{m-1}$X$_{4-m}$ (I-M1), wherein m, Y, A and X have the same meaning as defined above, and at least one pendant side chain comprising an end group of formula —O-A'Y'$_{m'-1}$X'$_{4-m'}$ (II-M2), wherein m', Y', A' and X' have the same meaning as defined above, wherein the mole ratio of the end groups of formula —O-AY$_{m-1}$X$_{4-m}$ (I-M1) to the end groups of formula —O-A'Y'$_{m'-1}$X'$_{4-m'}$ (II-M2) is preferably at least 0.01, more preferably at least 0.2, even more preferably at least 0.5.

The fluorinated main chain of the polymer (FG) typically comprises recurring units derived from vinylidene fluoride (VDF), at least one monomer (H) and, optionally, at least one monomer (F) different from VDF.

Under step (iii) of the process of the invention, a polymer (FH) is typically obtainable by hydrolysis and/or condensation of the polymer (FG). Under step (iii) of the process of the invention, a polymer (FH) is typically obtainable by hydrolysis and/or condensation of the end groups of formula —O-AY$_{m-1}$X$_{4-m}$ (I-M1) and the end groups of formula —O-A'Y'$_{m'-1}$X'$_{4-m'}$ (II-M2) of the polymer (FG).

Under step (iii) of the process of the invention, hydrolysis and/or condensation is usually carried out at room temperature or upon heating at a temperature lower than 100° C. The temperature will be selected having regard to the boiling point of the medium (L). Temperatures between 20° C. and 90° C., preferably between 20° C. and 50° C. will be preferred.

The polymer (FH) typically comprises, preferably consists of, one or more fluoropolymer domains consisting of chains obtainable by at least one polymer (FG) and one or more inorganic domains consisting of residues obtainable by at least one functional compound (M1) and at least one non-functional compound (M2).

It is understood that, while the hydrolysis and/or condensation reaction may be initiated during step (iii) of the process of the invention, said reaction may be continued during step (iv) of said process. As this will be recognized by the skilled in the art, the hydrolysis and/or condensation usually generates low molecular weight side products, which can be notably water or alcohols, as a function of the nature of the functional compound (M1) and of the non-functional compound (M2).

The Applicant thinks, without this limiting the scope of the invention, that at least one sulphonic group in its ester or halide form of the end groups of formula —O-$AY_{m-1}X_{4-m}$ (I-M1) of the polymer (FG) is advantageously converted by hydrolysis into a sulphonic group in its acid or salt form.

Under step (iii) of the process of the invention, an acid catalyst may be further added to the composition (C).

The selection of the acid catalyst is not particularly limited. The acid catalyst, if any, is typically selected from the group consisting of organic acids and inorganic acids. The acid catalyst, if any, is preferably selected from the group consisting of organic acids such as, for instance, formic acid.

Under step (iii) of the process of the invention, the composition (C) is applied onto at least one surface of the substrate by spray coating typically by using an airbrush.

For the purpose of the present invention, the term "airbrush" is intended to denote any air-operated devices suitable for spraying a liquid composition by a process of nebulization.

Under step (iii) of the process of the invention, the composition (C) is applied onto at least one surface of the substrate by spray coating typically by a process comprising:

(1) conveying the composition (C) through a nozzle of an airbrush; and (2) spraying the composition (C) onto at least one surface of the substrate thereby providing a coated substrate.

The skilled in the art will select the proper distance between the substrate and the nozzle of the airbrush as a function of the geometry of the airbrush.

Under step (iv) of the process of the invention, the coated substrate provided in step (iii) is dried typically at a temperature comprised between 60° C. and 200° C., preferably at a temperature comprised between 70° C. and 130° C.

Drying can be performed either under atmospheric pressure or under vacuum. Alternatively, drying can be performed under modified atmosphere, e.g. under an inert gas, typically exempt notably from moisture (water vapour content of less than 0.001% v/v).

The drying temperature will be selected so as to effect removal by evaporation of the medium (L) from the fluoropolymer film of the invention.

It is also understood that, under drying conditions, low molecular weight side products generated by the hydrolysis and/or condensation, which can be notably water or alcohol, as a function of the nature of the functional compound (M1) and of the non-functional compound (M2), are at least partially removed from the fluoropolymer film, possibly further promoting, by combined action of heat and side products removal, additional hydrolysis and/or condensation.

According to an embodiment of the process of the invention, under step (iv) of the process of the invention, the coated substrate provided in step (iii) is dried and then cured. Curing, if any, is typically carried out at a temperature comprised between 100° C. and 250° C., preferably between 120° C. and 200° C.

The fluoropolymer film of the invention is advantageously porous.

For the purpose of the present invention, the term "porous" is intended to denote either a film or a layer containing a plurality of voids, pores or holes of finite dimensions.

The fluoropolymer film of the invention advantageously has a porosity comprised between 10% and 90% by volume, preferably between 30% and 70% by volume based on the total volume of the fluoropolymer film.

The porosity of the fluoropolymer film of the invention can be measured by any suitable techniques.

The fluoropolymer film of the invention advantageously has a thickness comprised between 2 μm and 250 μm, preferably between 10 μm and 150 μm, more preferably between 20 μm and 50 μm.

The thickness of the fluoropolymer film of the invention can be measured by any suitable techniques.

In a third instance, the present invention pertains to use of the fluoropolymer film of the invention as separator for electrochemical devices.

It has been found that the separator of the invention successfully exhibits outstanding ionic conductivity values to be suitably used in electrochemical devices.

In a fourth instance, the present invention pertains to an electrochemical device comprising the separator of the invention.

Non-limiting examples of suitable electrochemical devices include, notably, batteries such as secondary batteries, fuel cells, capacitors and super capacitors.

Still, in a fifth instance, the present invention pertains to a secondary battery comprising:
a positive electrode,
a negative electrode, and
between said positive electrode and said negative electrode, the separator of the invention.

For the purpose of the present invention, the term "secondary battery" is intended to denote a rechargeable battery which needs an external electrical source to recharge it.

For the purpose of the present invention, the term "separator" is intended to denote a film which is capable of physically and electrically separating the positive electrode from the negative electrode of an electrochemical cell, while permitting electrolyte ions of the electrolyte to flow there through.

The electrochemical device typically further comprises at least one electrolyte solution comprising at least one metal salt.

The metal salt is typically selected from the group consisting of MeI, $Me(PF_6)_n$, $Me(BF_4)_n$, $Me(ClO_4)_n$, $Me(bis(oxalato)borate)_n$ ("$Me(BOB)_n$"), $MeCF_3SO_3$, $Me[N(CF_3SO_2)_2]_n$, $Me[N(C_2F_5SO_2)_2]_n$, $Me[N(CF_3SO_2)(R_FSO_2)]_n$ with $R_F$ being $C_2F_5$, $C_4F_9$, $CF_3OCF_2CF_2$, $Me(AsF_6)_n$, $Me[C(CF_3SO_2)_3]_n$, $Me_2S_n$, wherein Me is a metal, preferably a transition metal, an alkaline metal or an alkaline-earth metal, more preferably Me being Li, Na, K, Cs, and n is the valence of said metal, typically n being 1 or 2.

The metal salt is preferably selected from the group consisting of LiI, $LiPF_6$, $LiBF_4$, $LiClO_4$, lithium bis(oxalato)borate ("LiBOB"), $LiCF_3SO_3$, $LiN(CF_3SO_2)_2$, $LiN(C_2F_5SO_2)_2$, $M[N(CF_3SO_2)(R_FSO_2)]_n$ with $R_F$ being $C_2F_5$, $C_4F_9$, $CF_3OCF_2CF_2$, $LiAsF_6$, $LiC(CF_3SO_2)_3$, $Li_2S_n$ and combinations thereof.

The electrolyte solution typically comprises at least one metal salt in a concentration of advantageously at least 0.01 M, preferably at least 0.025 M, more preferably at least 0.05 M and of at most 1 M, preferably at most 0.75 M, more preferably at most 0.5 M.

The electrolyte solution typically comprises at least one metal salt dissolved in at least one organic carbonate and/or at least one ionic liquid.

Non-limiting examples of suitable organic carbonates include, notably, ethylene carbonate, propylene carbonate, mixtures of ethylene carbonate and propylene carbonate, dimethyl carbonate, diethyl carbonate, ethyl-methyl carbonate, butylene carbonate, vinylene carbonate, fluoroethylene carbonate, fluoropropylene carbonate and mixtures thereof.

Each of the positive electrode and the negative electrode of the secondary battery of the invention typically comprises at least one electro-active compound.

For the purpose of the present invention, the term "electro-active compound" is intended to denote a compound which can undergo reduction-oxidation electrochemical reactions during operation of the electrode in an electrochemical device.

The nature of the electro-active compound of the electrode depends on whether the electrode thereby provided is a positive electrode or a negative electrode.

The secondary battery of the invention is typically either an alkaline or an alkaline-earth secondary battery.

The secondary battery of the invention is preferably a Lithium-ion battery.

Electro-active compounds suitable for forming a positive electrode for a Lithium-ion battery may comprise a composite metal chalcogenide of formula $LiMQ_2$, wherein M is at least one metal selected from transition metals such as Co, Ni, Fe, Mn, Cr and V and Q is a chalcogen such as O or S. Among these, it is preferred to use a lithium-based composite metal oxide of formula $LiMO_2$, wherein M is the same as defined above. Preferred examples thereof may include $LiCoO_2$, $LiNiO_2$, $LiNi_xCo_{1-x}O_2$ (0<x<1) and spinel-structured $LiMn_2O_4$.

As an alternative, still in the case of forming a positive electrode for a Lithium-ion battery, the electro-active compound may comprise a lithiated or partially lithiated transition metal oxyanion-based electro-active material of formula $M_1M_2(JO_4)_fE_{1-f}$, wherein $M_1$ is lithium, which may be partially substituted by another alkali metal representing less than 20% of the $M_1$ metals, $M_2$ is a transition metal at the oxidation level of +2 selected from Fe, Mn, Ni or mixtures thereof, which may be partially substituted by one or more additional metals at oxidation levels between +1 and +5 and representing less than 35% of the $M_2$ metals, including 0, $JO_4$ is any oxyanion wherein J is either P, S, V, Si, Nb, Mo or a combination thereof, E is a fluoride, hydroxide or chloride anion, f is the molar fraction of the $JO_4$ oxyanion, generally comprised between 0.75 and 1.

The $M_1M_2(JO_4)_fE_{1-f}$ electro-active material as defined above is preferably phosphate-based and may have an ordered or modified olivine structure.

More preferably, the electro-active compound has formula $Li_{3-x}M'_yM''_{2-y}(JO_4)_3$ wherein 0≤x≤3, 0≤y≤2, M' and M" are the same or different metals, at least one of which being a transition metal, $JO_4$ is preferably $PO_4$ which may be partially substituted with another oxyanion, wherein J is either S, V, Si, Nb, Mo or a combination thereof. Still more preferably, the electro-active compound is a phosphate-based electro-active material of formula $Li(Fe_xMn_{1-x})PO_4$ wherein 0≤x≤1, wherein x is preferably 1 (that is to say, lithium iron phosphate of formula $LiFePO_4$).

Representative negative electrodes materials of alkaline or alkaline-earth secondary batteries include:

graphitic carbons able to intercalate alkaline or alkaline-earth metal, typically existing in forms such as powders, flakes, fibers or spheres (for example, mesocarbon microbeads) hosting at least one alkaline or alkaline-earth metal;

alkaline or alkaline-earth metal;

alkaline or alkaline-earth metal alloy compositions, including silicon-based alloys, germanium-based alloys;

alkaline or alkaline-earth metal titanates, advantageously suitable for intercalating alkaline or alkaline-earth metal with no induced strain.

Electro-active compounds suitable for forming a negative electrode for a Lithium-ion battery may preferably comprise:

graphitic carbons able to intercalate lithium, typically existing in forms such as powders, flakes, fibers or spheres (for example, mesocarbon microbeads) hosting lithium;

lithium metal;

lithium alloy compositions, including notably those described in U.S. Pat. No. 6,203,944 (3M INNOVATIVE PROPERTIES CO.) Mar. 20, 2001 and/or in WO 00/03444 (MINNESOTA MINING AND MANUFACTURING CO.) Jan. 20, 2000;

lithium titanates, generally represented by formula $Li_4Ti_5O_{12}$; these compounds are generally considered as "zero-strain" insertion materials, having low level of physical expansion upon taking up the mobile ions, i.e. $Li^+$;

lithium-silicon alloys, generally known as lithium silicides with high Li/Si ratios, in particular lithium silicides of formula $Li_{4.4}Si$; or lithium-germanium alloys, including crystalline phases of formula $Li_{4.4}Ge$.

The negative electrode may contain additives as will be familiar to those skilled in the art. Among them, mention can be made notably of carbon black, graphene or carbon nanotubes. As will be appreciated by those skilled in the art, the negative electrode may be in any convenient form including foils, plates, rods, pastes or as a composite made by forming a coating of the negative electrode material on a conductive current collector or other suitable support.

The selection of the hydrolysable group Y of the functional compound (M1) of formula (I) as defined above is not particularly limited provided that it enables under appropriate conditions the formation of a —O-A≡ bond. The hydrolysable group Y is typically selected from the group consisting of halogen atoms, preferably being a chlorine atom, hydrocarboxy groups, acyloxy groups and hydroxyl groups.

The functional compound (M1) is preferably of formula (I-A):

$$R^A_{4-m}A(Y^A)_m \qquad (I\text{-}A)$$

wherein m is an integer from 1 to 3, A is a metal selected from the group consisting of Si, Ti and Zr, $R^A$, equal to or different from each other and at each occurrence, is a $C_1$-$C_{12}$ hydrocarbon group comprising at least one —$SO_2M$ functional group, wherein M is selected from the group consisting of halogen atoms, such as F, Cl, Br and I, and —$O^-T^+$ groups, wherein $T^+$ is selected from the group consisting of $H^+$, $NH_4^+$, $K^+$, $Li^+$ and $Na^+$, and $Y^A$, equal to or different from each other and at each occurrence, is selected from the group consisting of halogen atoms, preferably being a chlorine atom, and —$OR^B$ groups, wherein $R^B$ is a $C_1$-$C_5$ linear or branched alkyl group, preferably $R^B$ being a methyl or ethyl group.

The functional compound (M1) is preferably of formula (I-B):

$$P—R^{A'}-A(Y^B)_3 \qquad \text{(I-B)}$$

wherein A is a metal selected from the group consisting of Si, Ti and Zr, $R^{A'}$, equal to or different from each other and at each occurrence, is a linear or branched $C_1$-$C_{12}$ aliphatic hydrocarbon group, P is a $C_6$-$C_{14}$ aromatic hydrocarbon group comprising at least one —$SO_2M$ functional group, wherein M is selected from the group consisting of halogen atoms, such as F, Cl, Br and I, and —$O^-T^+$ groups, wherein $T^+$ is selected from the group consisting of $H^+$, $NH_4^+$, $K^+$, $Li^+$ and $Na^+$, and $Y^B$, equal to or different from each other and at each occurrence, is selected from the group consisting of halogen atoms, preferably being a chlorine atom, and —$OR^{B'}$ groups, wherein $R^{B'}$ is a $C_1$-$C_5$ linear or branched alkyl group, preferably $R^{B'}$ being a methyl or ethyl group.

Non-limiting examples of suitable functional compounds (M1) of formula (I) include the followings: 2-(4-chlorosulfonylphenyl)ethyl trimethoxysilane and 2-(4-chlorosulphonylphenyl)ethyl trichlorosilane.

For the purpose of the present invention, the term "non-functional compound (M2)" is intended to denote a compound (M2) of formula (II) as defined above wherein none of the hydrocarbon groups X' comprise at least one functional group.

The selection of the hydrolysable group Y' of the non-functional compound (M2) of formula (II) as defined above is not particularly limited provided that it enables under appropriate conditions the formation of a -O-A= bond. The hydrolysable group Y' is typically selected from the group consisting of halogen atoms, preferably being a chlorine atom, hydrocarboxy groups, acyloxy groups and hydroxyl groups.

The non-functional compound (M2) is preferably of formula (II-A):

$$R^C_{4-m'}A(OR^D)_{m'} \qquad \text{(II-A)}$$

wherein m' is an integer from 1 to 4, and, according to certain embodiments, from 1 to 3, A is a metal selected from the group consisting of Si, Ti and Zr, $R^C$ and $R^D$, equal to or different from each other and at each occurrence, are independently selected from $C_1$-$C_{18}$ hydrocarbon groups.

Examples of non-functional compounds (M2) are notably trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

Mixtures of one or more non-functional compounds (M2) and one or more functional compounds (M2) may be used in the process of the invention.

Should the compound (M2) of formula (II) as defined above comprise at least one hydrocarbon group X' further comprising at least one functional group, it will be designated as functional compound (M2). Should the compound (M2) be a functional compound (M2), said functional compound (M2) is different from the functional compound (M1). Should the compound (M2) be a functional compound (M2), said functional compound (M2) comprises at least one hydrocarbon group X' comprising at least one functional group different from a sulphonic group in its acid, ester, salt or halide form.

Functional compounds (M2) can advantageously further modify the chemistry and the properties of the polymer (FG) over native polymer (F) and native inorganic phase.

The functional compound (M2) is preferably of formula (II-B):

$$R^{C'}_{4-m'}A(OR^{D'})_{m'} \qquad \text{(II-B)}$$

wherein m' is an integer from 1 to 4, and, according to certain embodiments, from 1 to 3, A is a metal selected from the group consisting of Si, Ti and Zr, $R^{C'}$ and $R^{D'}$, equal to or different from each other and at each occurrence, are independently selected from $C_1$-$C_{18}$ hydrocarbon groups, wherein $R^{C'}$ optionally comprises at least one functional group different from a sulphonic group in its acid, ester, salt or halide form.

Non-limiting examples of functional groups suitable for the functional compound (M2) include, notably, epoxy group, carboxylic acid group (in its acid, ester, amide, anhydride, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

Should the compound (M2) be a functional compound (M2), it is more preferably of formula (II-C):

$$R^{C''}_{4-m''}A(OR^{D''})_{m''} \qquad \text{(II-C)}$$

wherein m" is an integer from 1 to 3, A is a metal selected from the group consisting of Si, Ti and Zr, $R^{C''}$, equal to or different from each other and at each occurrence, is a $C_1$-$C_{12}$ hydrocarbon group comprising at least one functional group different from a sulphonic group in its acid, ester, salt or halide form, and $R^{D''}$, equal to or different from each other and at each occurrence, is a $C_1$-$C_5$ linear or branched alkyl group, preferably $R^{D''}$ being a methyl or ethyl group.

Examples of functional compounds (M2) are notably vinyltriethoxysilane, vinyltrimethoxysilane, vinyltrismethoxyethoxysilane of formula $CH_2$=$CHSi(OC_2H_4OCH_3)_3$, 2-(3,4-epoxycyclohexylethyltrimethoxysilane) of formula:

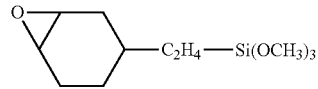

glycidoxypropylmethyldiethoxysilane of formula:

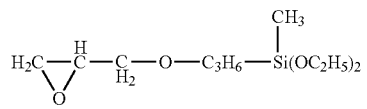

glycidoxypropyltrimethoxysilane of formula:

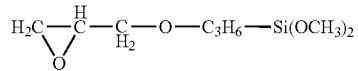

methacryloxypropyltrimethoxysilane of formula:

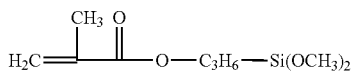

aminoethylaminpropylmethyldimethoxysilane of formula:

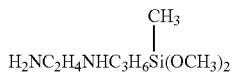

aminoethylaminpropyltrimethoxysilane of formula:

3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3-acryloxypropyl)dimethylmethoxysilane, (3-acryloxypropyl)methyldichlorosilane, (3-acryloxypropyl)methyldimethoxysilane, 3-(n-allylamino)propyltrimethoxysilane, carboxyethylsilanetriol, and its sodium salts, triethoxysilylpropylmaleamic acid of formula:

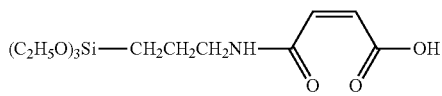

N-(trimethoxysilylpropyl)ethylene-diamine triacetic acid, and its sodium salts, 3-(triethoxysilyl)propylsuccinic anhydride of formula:

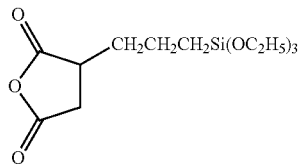

acetamidopropyltrimethoxysilane of formula $H_3C-C(O)NH-CH_2CH_2CH_2-Si(OCH_3)_3$, alkanolamine titanates of formula $Ti(L)_x(OR)_y$, wherein L is an amine-substituted alkoxy group, e.g. $OCH_2CH_2NH_2$, R is an alkyl group, and x and y are integers such that x+y=4.

The mole ratio of the functional compound (M1) to the non-functional compound (M2) in the composition (C) is preferably at most 2.0, more preferably at most 1.5, even more preferably at most 1.0.

The mole ratio of the functional compound (M1) to the non-functional compound (M2) in the composition (C) is preferably at least 0.01, more preferably of at least 0.2, even more preferably of at least 0.5.

Very good results have been obtained by using a mole ratio of the functional compound (M1) to the non-functional compound (M2) comprised between 0.5 and 1.5, preferably between 0.5 and 1.0.

For the purpose of the present invention, by the term "liquid medium [medium (L)]" it is hereby intended to denote a composition comprising one or more substances in the liquid state at 20° C. under atmospheric pressure.

The medium (L) typically comprises at least one organic solvent [solvent (S)].

The choice of the solvent (S) is not particularly limited provided that it is suitable for solubilising the polymer (F).

Non-limiting examples of solvents (S) suitable for use in the medium (L) include, notably, the followings:

ketones such as acetone, methylethylketone, methylisobutyl ketone, diisobutylketone, cyclohexanone, isophorone;

linear or cyclic esters such as isopropyl acetate, n-butyl acetate, methyl acetoacetate, dimethyl phthalate and y-butyrolactone;

linear or cyclic amides such as N,N-diethylacetamide, N,N-dimethylacetamide, N,N-dimethylformamide and N-methyl-2-pyrrolidone; and dimethyl sulfoxide.

The composition (C) may further comprise at least one inorganic filler [filler (I)].

The choice of the filler (I) is not particularly limited.

The filler (I) is typically provided in the form of solid particles.

The filler (I) particles generally have an average particle size of from 0.001 µm to 200 µm, preferably of from 0.01 µm to 50 µm, more preferably of from 0.03 µm to 10 µm.

The composition (C) may further comprise at least one filler (I) different from the either the functional compound (M1) or the non-functional compound (M2) in an amount of from 60% to 95% by weight, more preferably of from 65% to 90% by weight, with respect to the total weight of the polymer (F) and the filler (I).

Among fillers (I) suitable for being used in the process of the invention, mention can be made of inorganic oxides, including mixed oxides, metal sulphates, metal carbonates, metal sulphides and the like.

A class of compounds which gave particularly good results within the context of the present invention are notably silicates, aluminium-silicates and magnesium silicates, all optionally containing additional metals such as sodium, potassium, iron or lithium.

These silicates, aluminium-silicates and magnesium silicates, all optionally containing additional metals such as sodium, potassium, iron or lithium, can be notably smectic clays, possibly of natural origin, such as notably montmorillonites, sauconite, vermiculite, hectorite, saponite, nontronite. As an alternative, silicates, aluminium-silicates and magnesium silicates, all optionally containing additional metals such as sodium, potassium, iron or lithium, can be selected among synthetic clays, like notably fluorohectorite, hectorite, laponite.

The filler (I) may be also selected from ion-conducting inorganic filler materials.

For the purpose of the present invention, by the term "ion-conducting" it is hereby intended to denote a material allowing electrolyte ions to flow there through.

Non-limiting examples of suitable ion-conducting inorganic filler materials include, notably, lithium ceramics such as $LiTaO_3-SrTiO_3$, $LiTi_2(PO_4)_3-Li_2O$ and $Li_4SiO_4-Li_3PO_4$.

Also, fillers (I) having on their surface reactive groups towards the functional compound (M1) and/or the non-functional compound (M2) can be used in the process of the invention. Among surface reactive groups, mention is notably made of hydroxyl groups.

Without being bound by this theory, the Applicant believes that reaction between at least a fraction of the hydrolysable group(s) Y of the functional compound (M1) and/or at least a fraction of the hydrolysable group(s) Y of the non-functional compound (M2) with at least a fraction of said surface reactive groups of the filler (I) can occur simultaneously with the reaction of at least a fraction of the hydrolysable group(s) Y of the functional compound (M1) and/or at least a fraction of the hydrolysable group(s) Y of the non-functional compound (M2) with at least a fraction of the hydroxyl groups of the polymer (F) so that, in subsequent hydrolysis and/or condensation, chemical bonding between the polymer (F) and the filler (I) is likely achieved through the inorganic domains derived from the functional compound (M1) and/or the non-functional compound (M2).

The filler (I) is preferably selected among inorganic oxides. Non-limiting examples of suitable inorganic oxides include, notably, $SiO_2$, $TiO_2$, $ZnO$, $Al_2O_3$.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not (imitative of the scope of the invention.

Raw Materials

Polymer (F-1A): VDF-HEA (0.8% by moles)-HFP (2.3% by moles) having a Melt Flow Index (MFI) of 15 g/min (2.16 Kg, 230° C.).

Polymer (F-1B): VDF-HEA (0.8% by moles) having a MFI of 15 g/min (2.16 Kg, 230° C.).

Polymer (A): VDF (100% by moles) having a MFI of 15 g/min (2.16 Kg, 230° C.).

CSPTC [compound (M1-A)]: 2-(4-chlorosulfonylphenyl) ethyltrichlorosilane (50% by weight in methylene chloride).

TEOS [compound (M2-A)]: $Si(OC_2H_5)_4$

Measurement of the Thickness of the Fluoropolymer Film

The thickness of the film was determined with a Palmer micrometer from Mitutoyo America Corporation. The thickness of the film was calculated by averaging the measurements on five locations on the film.

Measurement of the Ionic Conductivity of the Fluoropolymer Film

The film was embedded in a solution of $LiPF_6$ 1M in ethylene carbonate (EC)/dimethyl carbonate (DMC) for 2 hours in a glove box under Argon. The film was then put between two stainless steel electrodes and sealed in a Swagelok type device made of polytetrafluoroethylene. The resistance of the film was measured and the ionic conductivity (a) was calculated using the following equation:

Ionic conductivity$(\sigma) = d/(R_b \times S)$ wherein d represents the thickness [cm] of the film, $R_b$ represents the bulk resistance [Ω] and S represents the area [$cm^2$] of the stainless steel electrode.

EXAMPLES 1 to 7

Manufacture of a Fluoropolymer Film by Spray Coating

Films were prepared via sol-gel procedure in N,N-dimethyl formamide (DMF) by processing by using a spray-coating technique a composition comprising a 1 g of a polymer (F-1) dissolved at room temperature in 9 g of previously dried DMF under vigorous stirring. After complete dissolution, TEOS was added under magnetic stirring followed by addition thereto of a solution of CSPTC in methylene chloride. After complete dissolution of TEOS and CSPTC, the mixture was left under stirring for one hour in a closed glass vial. This final solution was spray-coated onto a substrate made from an ECTFE polymer having a molar ratio of CTFE and ethylene of 50:50 and containing 3% by weight of mica, said ECTFE polymer having a melting point of 240° C. The substrate of about of 64 $cm^2$ is used (8 cm×8 cm). After 30 minutes drying at room temperature, the films so obtained were transferred to an oven at 70° C. and kept overnight. The spray coating deposition was carried out by using a double action airbrush from Iwata connected to a pump. The main characteristics of the airbrush used in the process of the invention are the followings:

1. Needle and fluid nozzle: 0.20 mm;
2. Distance between the needle and the substrate equal to 20 cm;
3. Main lever tension adjusted to its maximum;
4. Pump capacity adjusted to 0.2 mPa.

For instance, a fluoropolymer hybrid organic-inorganic composite [polymer (FH)] having nominally 30% by weight of $SiO_2$ (assuming complete condensation) and a molar ratio CPSTC:TEOS of 2:1 was manufactured by using 0.15 g of TEOS and 1 g of a solution of CSPTC in methylene chloride.

COMPARATIVE EXAMPLE 1

The same procedure as detailed for Examples 1 to 6 was followed but using only TEOS.

COMPARATIVE EXAMPLES 2 TO 4

The same procedure as detailed for Examples 1 to 8 was followed but using polymer (A).

As can be seen in Table 1 here below, the fluoropolymer films obtainable by the process according to the invention as notably embodied by the films of Examples 1 to 7 according to the invention are advantageously endowed with good or higher ionic conductivity values as compared to fluoropolymer films according to Comparative Examples 1 to 4.

In particular, it has been surprisingly found that the ionic conductivity values of the fluoropolymer films obtainable by the process of the invention are advantageously increased by increasing the molar ratio of the functional compound (M1) to the non-functional compound (M2) up to a molar ratio of at most 2.0, preferably of at most 1.5.

On the contrary, the ionic conductivity values of the fluoropolymer films according to Comparative Examples 2 to 4 are disadvantageously decreased by increasing the molar ratio of the functional compound (M1) to the non-functional compound (M2) up to a molar ratio of at most 1.5.

Also, the fluoropolymer films obtainable by the process according to the invention as notably embodied by the films of Examples 1 to 7 according to the invention are advantageously endowed with good or higher ionic conductivity values, while having a high thickness, as compared to fluoropolymer films according to Comparative Examples 1 to 4.

TABLE 1

| Run | Polymer | (M1-A)/(M2-A) molar ratio | Ionic conductivity [mS/cm] | Thickness [μm] |
|---|---|---|---|---|
| Ex. 1 | (F-1A) | 0.25 | 0.65 | 80 |
| Ex. 2 | (F-1A) | 0.5 | 0.65 | 105 |

TABLE 1-continued

| Run | Polymer | (M1-A)/(M2-A) molar ratio | Ionic conductivity [mS/cm] | Thickness [μm] |
|---|---|---|---|---|
| Ex. 3 | (F-1A) | 0.75 | 2.36 | 100 |
| Ex. 4 | (F-1A) | 1.5 | 3.07 | 85 |
| Ex. 5 | (F-1A) | 2.0 | 0.33 | 60 |
| Comp. Ex. 1 | (F-1A) | 0 | 0.25 | 25 |
| Ex. 6 | (F-1B) | 0.5 | 0.90 | 105 |
| Ex. 7 | (F-1B) | 0.75 | 0.90 | 65 |
| Comp. Ex. 2 | (A) | 0.5 | 0.22 | 50 |
| Comp. Ex. 3 | (A) | 1.0 | 0.17 | 70 |
| Comp. Ex. 4 | (A) | 1.5 | 0.15 | 30 |

In view of the above, it has been found that the fluoropolymer films obtainable by the process of the invention are particularly suitable for use as separators for electrochemical devices.

The invention claimed is:

1. A fluoropolymer film comprising at least one fluoropolymer hybrid organic/inorganic composite [polymer (FH)] obtainable by hydrolysis and/or condensation of at least one grafted fluoropolymer [polymer (FG)], said polymer (FG) comprising:
    a fluorinated main chain comprising recurring units derived from at least one fluorinated monomer (F) and at least one hydrogenated monomer (H),
    at least one pendant side chain comprising an end group of formula —O-AY$_{m-1}$X$_{4-m}$ (I-M1), wherein m is an integer from 1 to 3, A is a metal selected from the group consisting of Si, Ti and Zr, Y is a hydrolysable group and X is a hydrocarbon group comprising at least one sulphonic group in its acid, ester, salt or halide form, and
    at least one pendant side chain comprising an end group of formula —O-A'Y'$_{m'-1}$X'$_{4-m'}$(II-M2), wherein m' is an integer from 1 to 4, A' is a metal selected from the group consisting of Si, Ti and Zr, Y' is a hydrolysable group and X' is a hydrocarbon group;
    wherein the mole ratio of the end groups of formula —O-AY$_{m-1}$X$_{4-m}$ (I-M1) to the end groups of formula —O-A'Y'$_{m'-1}$X'$_{4-m'}$(II-M2) in polymer (FG) is at most 2.0.

2. The fluoropolymer film according to claim 1, wherein the mole ratio of the end groups of formula —O-AY$_{m-1}$X$_{4-m}$(I-M1) to the end groups of formula —O-A'Y'$_{m'-1}$X'$_{4-m'}$(II-M2) in polymer (FG) is at least 0.01.

3. The fluoropolymer film according to claim 1, wherein the fluorinated main chain of the polymer (FG) comprises recurring units derived from vinylidene fluoride (VDF), at least one monomer (H) and, optionally, at least one monomer (F) different from VDF.

4. A process for the manufacture of the fluoropolymer film according to claim 1, said process comprising:
    applying, by spray coating onto at least one surface of a substrate, a composition [composition (C)] comprising:
    at least one fluoropolymer [polymer (F)] comprising recurring units derived from at least one fluorinated monomer (F) and at least one hydrogenated monomer comprising at least one hydroxyl group [monomer (OH)],
    at least one functional metal compound [functional compound (M1)] of formula (I):

$$X_{4-m}AY_m \quad (I)$$

wherein m is an integer from 1 to 3, A is a metal selected from the group consisting of Si, Ti and Zr, Y is a hydrolysable group and X is a hydrocarbon group comprising at least one sulphonic group in its acid, ester, salt or halide form,
    at least one non-functional metal compound [non-functional compound (M2)] of formula (II):

$$X'_{4-m'}A'Y'_{m'} \quad (II)$$

wherein m' is an integer from 1 to 4, A' is a metal selected from the group consisting of Si, Ti and Zr, Y' is a hydrolysable group and X' is a hydrocarbon group, and
    a liquid medium (L);
    thereby providing a coated substrate; and
    drying the coated substrate.

5. The process according to claim 4, wherein the mole ratio of the functional compound (M1) to the non-functional compound (M2) in the composition (C) is at most 2.0.

6. The process according to claim 4, wherein the mole ratio of the functional compound (M1) to the non-functional compound (M2) in the composition (C) is at least 0.01.

7. The process according to claim 5, wherein the monomer (OH) of the polymer (F) is selected from the group consisting of (meth)acrylic monomers of formula (III):

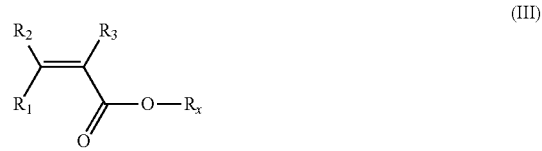

wherein each of $R_1$, $R_2$ and $R_3$, equal to or different from each other, is independently a hydrogen atom or a $C_1$-$C_3$ hydrocarbon group, and $R_x$ is a $C_1$-$C_{05}$ hydrocarbon moiety comprising at least one hydroxyl group.

8. The process according to claim 4, wherein polymer (F) in the composition (C) is selected from the group consisting of polymers (F-1) comprising recurring units derived from:
    vinylidene fluoride (VDF),
    at least one monomer (OH) of formula (III):

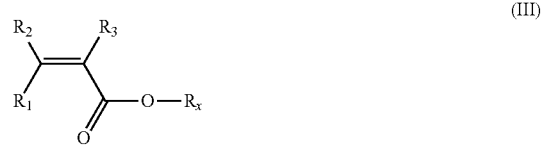

wherein each of $R_1$, $R_2$ and $R_3$, equal to or different from each other, is independently a hydrogen atom or a $C_1$-$C_3$ hydrocarbon group, and $R_x$ is a $C_1$-$C_{05}$ hydrocarbon moiety comprising at least one hydroxyl group, and
    optionally, at least one monomer (F) different from VDF.

9. The process according to claim 4, wherein composition (C) comprises at least one polymer (F) in an amount comprised between 2% and 30% by weight, based on the total weight of said at least one polymer (F) and the medium (L).

10. The process according to claim 4, wherein the functional compound (Ml) in the composition (C) is of formula (I-A):

 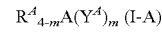

wherein m is an integer from 1 to 3, A is a metal selected from the group consisting of Si, Ti and Zr, $R^A$, equal to or different from each other and at each occurrence, is a $C_1$-$C_{12}$ hydrocarbon group comprising at least one —$SO_2M$ functional group, wherein M is selected from the group consisting of halogen atoms, such as F, Cl, Br and I, and —$O^-T^+$ groups, wherein $T^+$ is selected from the group consisting of $H^+$, $NH_4^+$, $K^+$, $Li^+$ and $Na^+$, and $Y^A$, equal to or different from each other and at each occurrence, is selected from the group consisting of halogen atoms, and —$OR^B$ groups, wherein $R^B$ is a $C_1$-$C_5$ linear or branched alkyl group.

11. The process according to claim 4, wherein the substrate comprises a composition comprising:

from 70% to 99.9% by weight, based on the total weight of the composition, of at least one polymer (F) selected from the group consisting of polymers (F-2) comprising recurring units derived from at least one per(halo)fluoromonomer selected from the group consisting of tetrafluoroethylene (TFE) and chlorotrifluoroethylene (CTFE), at least one hydrogenated monomer (H) selected from ethylene, propylene and isobutylene, and, optionally, or more additional monomers, and from 0.1% to 30% by weight, based on the total weight of the composition, of mica.

12. The process according to claim 4, wherein the substrate is a separator for an electrochemical device.

13. The process according to claim 4, wherein the substrate is an electrode for an electrochemical device.

14. A separator for an electrochemical device comprising the fluoropolymer film according to claim 1.

15. The fluoropolymer film according to claim 1, wherein the mole ratio of the end groups of formula —O-$AY_{m-1}X_{4-m}$(I-M1) to the end groups of formula —O-$A'Y'_{m'-1}X'_{4-m}$(II-M2) in polymer (FG) is at most 1.5 and at least 0.2.

16. The process according to claim 5, wherein the mole ratio of the functional compound (M1) to the non-functional compound (M2) in the composition (C) is at most 1.5 and at least 0.2.

17. The process according to claim 9 wherein composition (C) comprises at least one polymer (F) in an amount comprised between 5% and 15% by weight, based on the total weight of said at least one polymer (F) and the medium (L).

18. The process according to claim 11, wherein the substrate comprises a composition comprising:

from 90% to 99% by weight, based on the total weight of the composition, of at least one polymer (F) selected from the group consisting of polymers (F-2) comprising recurring units derived from at least one per(halo)fluoromonomer selected from the group consisting of tetrafluoroethylene (TFE) and chlorotrifluoroethylene (CTFE), at least one hydrogenated monomer (H) selected from ethylene, propylene and isobutylene, and, optionally, or more additional monomers, and from 1% to 10% by weight, based on the total weight of the composition, of mica.

* * * * *